(12) United States Patent
Fuhrken et al.

(10) Patent No.: US 7,735,934 B2
(45) Date of Patent: Jun. 15, 2010

(54) HEIGHT-ADJUSTABLE DEFLECTION DEVICE FOR A THREE-POINT BELT, VEHICLE SEAT COMPRISING A THREE-POINT BELT AND METHOD FOR THE HEIGHT ADJUSTMENT OF THE UPPER HOLDING POINT OF A THREE-POINT BELT

(75) Inventors: Dietmar Fuhrken, Lemgo (DE); Winfried Titz, Detmold (DE)

(73) Assignee: Isringhausen GmbH & Co. KG, Lemgo (DE)

( * ) Notice: Subject to any disclaimer, the term of this patent is extended or adjusted under 35 U.S.C. 154(b) by 230 days.

(21) Appl. No.: 11/824,952

(22) Filed: Jul. 3, 2007

(65) Prior Publication Data
US 2008/0048483 A1    Feb. 28, 2008

Related U.S. Application Data

(63) Continuation-in-part of application No. PCT/EP2006/000039, filed on Jan. 4, 2006.

(30) Foreign Application Priority Data
Jan. 4, 2005    (DE) .................. 10 2005 000 736

(51) Int. Cl.
*B60R 22/00*    (2006.01)
*B60N 2/00*    (2006.01)

(52) U.S. Cl. .................. 297/483; 297/475; 280/808

(58) Field of Classification Search ................ 297/483, 297/468, 475, 473; 280/808, 801.1
See application file for complete search history.

(56) References Cited

U.S. PATENT DOCUMENTS 4,949,994 A    8/1990    Zawisa

| 5,016,916 | A |   | 5/1991 | Yokote et al. |
|-----------|---|---|--------|---------------|
| 5,088,794 | A | * | 2/1992 | Iwami et al. ................. 297/483 |
| 5,544,917 | A | * | 8/1996 | Loxton et al. ............. 280/801.2 |
| 5,556,171 | A | * | 9/1996 | Busch ......................... 297/483 |
| 5,609,396 | A | * | 3/1997 | Loxton et al. ................ 297/473 |
| 5,658,051 | A | * | 8/1997 | Vega et al. ................... 297/483 |

FOREIGN PATENT DOCUMENTS

| DE | 35 30 491 A1 | 3/1987 |
| DE | 35 30 495 A1 | 3/1987 |
| DE | 91 02 217 U1 | 8/1991 |
| EP | 0 359 954 A1 | 3/1990 |
| EP | 0 374 893 A2 | 6/1990 |
| FR | 2.225.011    | 10/1974 |
| JP | 2001 158327  | 6/2001 |

OTHER PUBLICATIONS

International Search Report, from International Application No. PCT/EP2006/072574 A1 dated Mar. 27, 2006.

* cited by examiner

*Primary Examiner*—Milton Nelson, Jr.
(74) *Attorney, Agent, or Firm*—Sound Intellectual Property

(57) ABSTRACT

Height-adjustable deflection devices for an upper holding point of a three-point belt having a holder that can be attached to a supporting member of a vehicle seat or connected to a framework of a vehicle, wherein in the holder includes a deflector movably attached thereto, and having a reel with a spindle over which a seat belt strap of the three-point belt can be guided, and further having a housing with an outlet slot for the seat belt strap. The holder further includes first connector and the deflector includes a second connector that in a locked position engage with each other in a form-locking manner and, in an adjustment position, do not engage with each other. As a result, the deflector can be rotated about the spindle when the first and second connectors are in the adjustment position. In addition the invention relates to vehicle seats including the above-referenced height-adjustable deflection device.

20 Claims, 3 Drawing Sheets

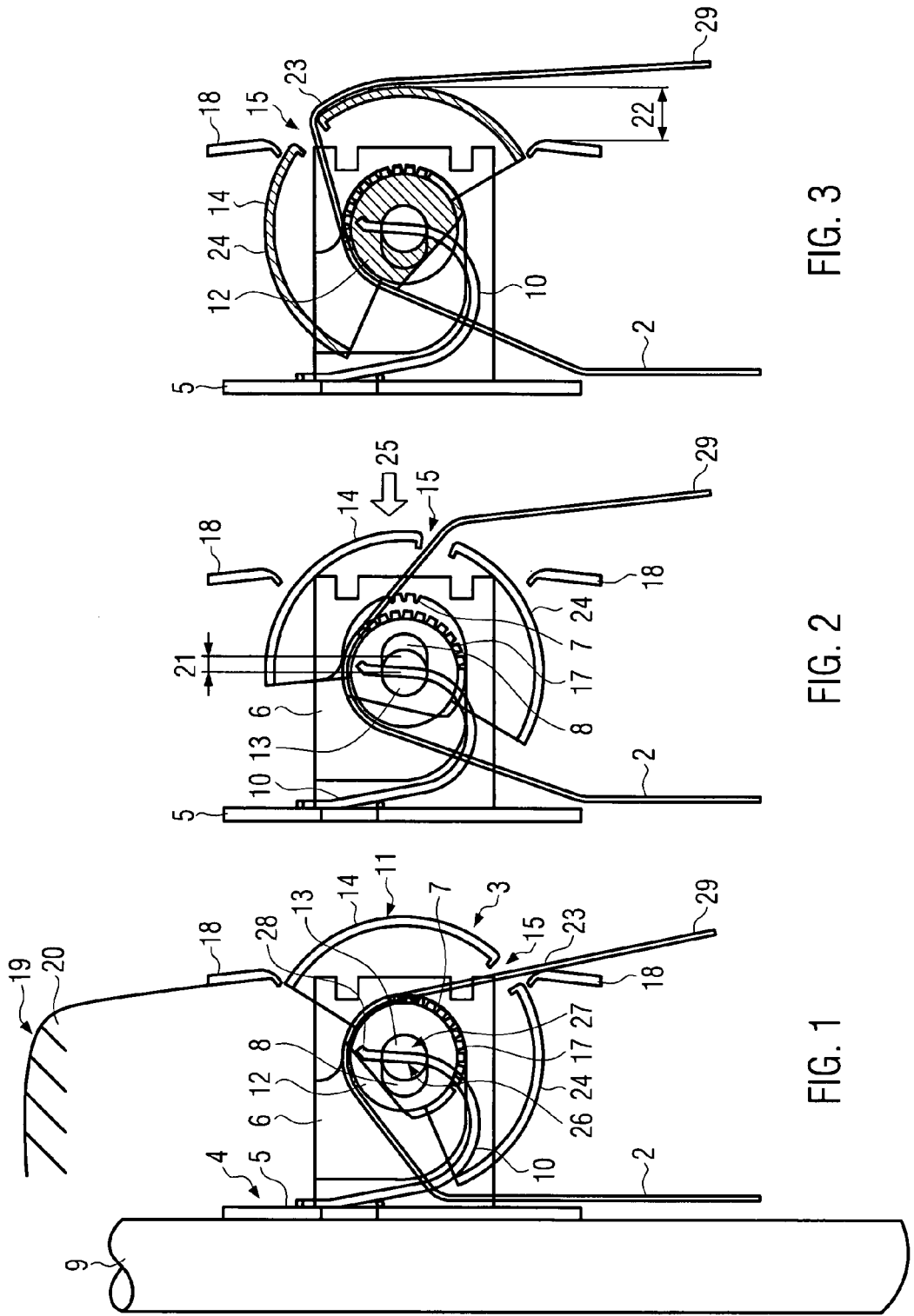

Figure 4:
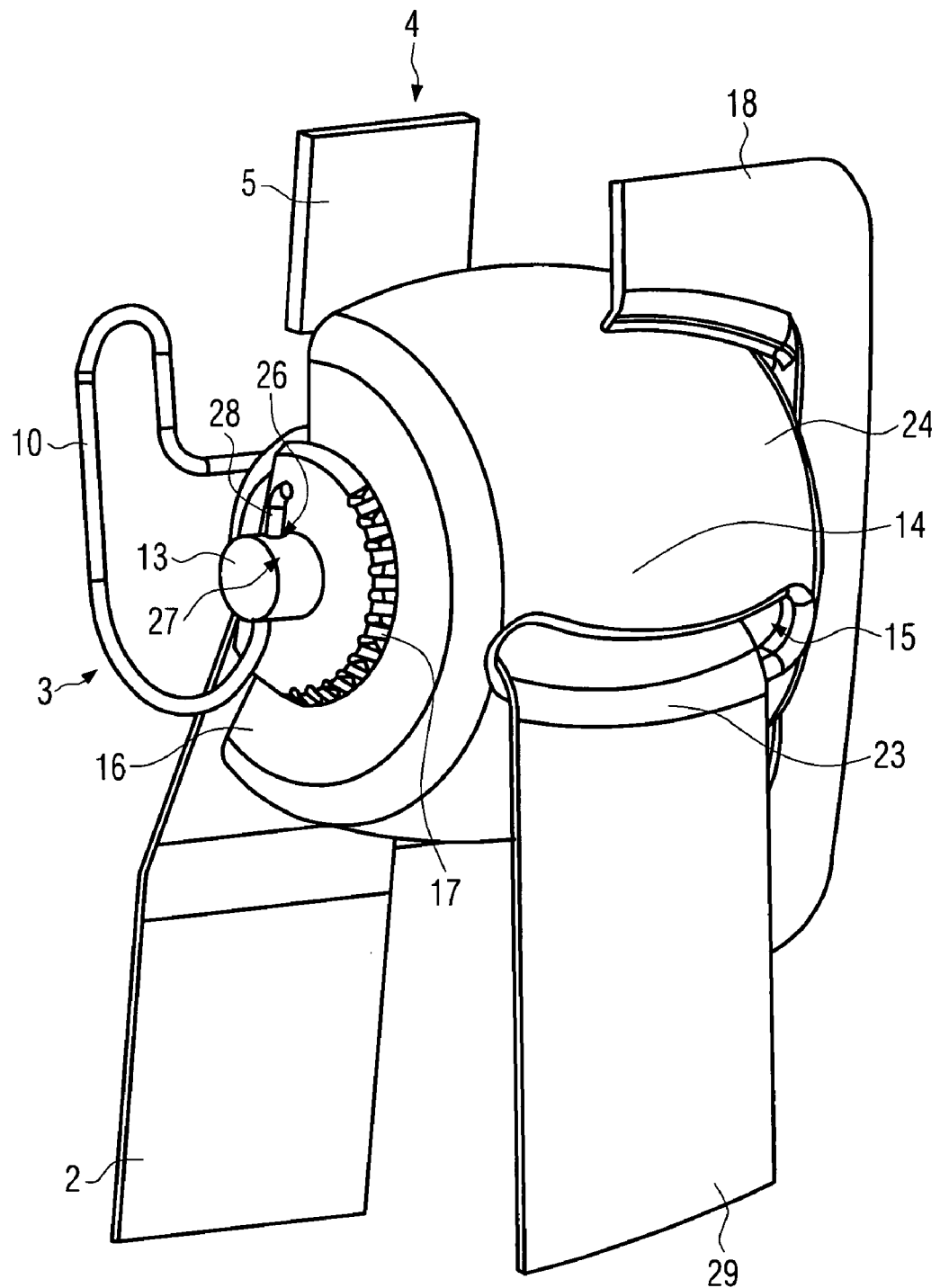

HEIGHT-ADJUSTABLE DEFLECTION DEVICE FOR A THREE-POINT BELT, VEHICLE SEAT COMPRISING A THREE-POINT BELT AND METHOD FOR THE HEIGHT ADJUSTMENT OF THE UPPER HOLDING POINT OF A THREE-POINT BELT

This is a continuation-in-part application that claims benefit, under 35 USC §120, of co-pending International Application number PCT/EP2006/000039, published in German, filed on 4 Jan. 2006, designating the United States, is being claimed, said application claiming priority to German Patent Application number DE 10 2005 000 736.8, filed on 4 Jan. 2005, which applications are incorporated herein by reference.

The invention relates to a height-adjustable deflection device for the upper holding point of a three-point belt, a vehicle seat with such a height-adjustable deflection device and a method for the height adjustment of the upper holding point of a three-point belt.

Commercial vehicle seats in particular are preferably equipped with pneumatically or mechanically sprung vibration-damping systems and thus protect the driver from vibrations of different frequency and amplitude which are unpleasant and harmful to health. A further safety element is the three-point belt. The stationary vehicle-side attachment of the third belt point e.g. to the B-column leads to a clear loss of comfort due to the relative movement between vehicle and seat or driver. Safety and comfort are offered by vehicle seats with a fully integrated three-point belt system, with a belt-end fitting arranged seat-side in the region of the pelvis and, opposite, a seat-belt lock, on the right in the direction of travel, for the driver's side. The shoulder belt outlet is integrated backrest-side and connected to the belt reel of an automatic belt system. A problem with three-point seat belts is that, in the case of a fixed upper holding point, a sloping shoulder belt cannot operate optimally for different-sized individuals. In order to improve this effect it must therefore be possible for the height of the upper holding point to be varied. From DE 35 30 495 A1 a device is known by means of which the height of the upper holding point can be varied. For this purpose a guide slot running obliquely from top to bottom is formed on the backrest of the vehicle seat. It has a slot opening with a width approximately 3.5 times the width of the seat belt. This makes it possible for the upper holding point to be located higher or lower depending on the size of the occupant. An improved effect of the three-point belt on the occupant is thereby achieved. However, the seat belt can unintentionally be moved up or down within the guide slot, with the result that the optimum height is not permanently guaranteed. Thus the better effect which is possible in principle may no longer come about under certain circumstances.

From JP 2001-158327 A height-adjustable deflection device for the upper holding point of a three-point belt with a holder is known which can be attached to a supporting member of a vehicle seat. In the holder a deflector is movably attached which has a reel with a spindle, over which the seat belt strap of a three-point belt is guided. Parallel to the spindle of the reel a housing has an outlet slot for the seat belt strap. On the holder and on the deflector, connection means are formed such that, in a locked position, they are in form-locking engagement with each other and, in an adjustment position, are not in engagement with each other. The deflector can thus be rotated about a spindle in the adjustment position. The holder has a connection plate and two supporting brackets, in each of which an oblong hole is formed to receive the spindle of the deflector. Such a device is not easy to operate, however, and is also not easy to fit, due to the various parts required.

The object of the invention is therefore to provide a height-adjustable deflection device for the upper holding point of a three-point belt which allows an easy adjustment of the height and at the same time this upper holding point can no longer be unintentionally changed. This is also to be achieved by as simple as possible a method.

The object is achieved by a height-adjustable deflection device with the features of claim 1 and a vehicle seat with the features of claim 9. The height of the upper holding point of the three-point belt is fixed by the outlet slot. The outlet slot is located in the deflector which, in the locked position, is connected to the holder in form-locking manner via corresponding connecting means. A secure fixing of the upper holding point is thus guaranteed. Because, in an adjustment position, there is no engagement of the connecting means between the holder and the deflector, the deflector can be rotated about the spindle via the reel in this position. The height of the outlet slot which is formed in the housing of the deflector thereby changes. The desired height of the outlet slot and hence of the upper holding point can thus be fixed very easily and on an individual basis. The height of the upper holding point is fixed as described above by a movement of the holder from the adjustment position into the locked position and cannot be unintentionally changed. It is thus guaranteed that the upper holding point, once set to the occupant's body size, cannot be inadvertently changed again. An optimum effect of the three-point belt on the occupant is thereby always guaranteed. In addition the height-adjustable deflection device according to the invention is also very simple as regards structure and operation as the reel and the deflector have a common shared spindle. Because the holder has a connecting plate and two supporting brackets, in each of which an oblong hole is formed for receiving the spindle of the deflector, a very simple design results for the movement of the spindle of the reel between locked position and adjustment position. Because the spindle of the deflector is pressed into the locked position by means of a spring, in particular a spiral spring. This is an extremely simple and efficient possibility for holding the deflector in its locked position if no adjustment is desired. On the other hand a switch into the adjustment position against the pressure of the spring can easily be carried out. After the adjustment the deflector then automatically returns to its locked position. This also makes possible the method according to the invention according to claim 10 with the advantages just mentioned. By a vehicle seat, in the context of this application, is meant a seat for a motor vehicle (also a commercial vehicle), for an aircraft or other vehicles which require the fastening-in of the occupant (also fairground rides).

An advantageous development of the invention provides that the first connecting means and the second connecting means are in each case gear tooth systems matched to each other. This results in a very simple design for connecting means which are easily released from each other in order to move them into the adjustment position, and easily brought into form-locking engagement with each other in order to move them into their locked position.

A further advantageous development of the invention provides that the housing of the deflector has a casing surface which is cylindrical, or formed concentrically convex, about the spindle. As the outlet slot for the three-point belt which defines the upper holding point is located on a cylindrical casing surface, the horizontal position of the outlet slot is also changed in the case of a vertical movement due to the rotary movement and its arrangement on the cylindrical casing surface. The upper holding point is thereby advantageously further forward in the case of large occupants than in the case of small occupants, which has proved particularly favourable.

A further advantageous development of the invention provides that the reel comprises a belt retractor. Two parts are thereby integrated in one. It is thus no longer necessary to attach a belt retractor at another point in addition to the reel. This is very advantageous in the case of height-adjustable deflection devices which are integrated into the vehicle seat, as space is thus saved within the vehicle seat.

A further advantageous development of the invention provides that the height-adjustable deflection device is arranged in the vehicle seat and the deflector is partly covered by a shield. In the case of a deflection device integrated in the vehicle seat, on the one hand a good aesthetic effect is produced and on the other hand unintentional pinching or other injury cannot occur when adjusting the deflection device.

A further advantageous development of the invention provides that the spindle has, in the region of each of its two ends, a bore through which the free ends of the spring are guided. The result is that the spindle is stationary and is captive in axial direction.

A further advantageous development of the invention provides that the spindle is formed in one piece with the reel and/or the housing. The whole deflector is thus constructed in a single piece.

Further advantages and details of the invention are described below with reference to the embodiment example represented in the figures. These show in detail:

FIG. 1 a schematic section through an embodiment example of a height-adjustable deflection device according to the invention in its locked position for a small occupant, FIG. 2 the deflection device of FIG. 1 in its adjustment position during an adjustment operation, FIG. 3 the deflection device of FIGS. 1 and 2 in its locked position for a large occupant, FIG. 4 a perspective, partially cut-out view of the deflector devices from FIGS. 1 to 3 and FIG. 5 a vehicle seat with integrated deflection device according to FIG. 4.

FIG. 1 shows a longitudinal section through a vehicle seat 1 (see FIG. 5), which has a deflection device 3 according to the invention, by means of which the height of the upper holding point 23 of a three-point belt 2 can be changed. The deflection device 3 according to the invention has three components whose cooperation brings with it the advantages according to the invention. These are a holder 4, a deflector 11 and a spring 10 arranged between these two.

In the embodiment example represented, the holder 4 and thus the whole deflection device 3 according to the invention is fixedly connected to a supporting member 9 of the vehicle seat 1 via a connecting plate 5. Here all known connection methods are possible, for example welding, riveting or screwing. Beside the arrangement shown within the vehicle seat 1—in the case represented in the backrest 19 within the upholstery 20—the deflection device 3 according to the invention can equally be attached directly to the framework of the vehicle in which the vehicle seat 1 is located.

This corresponds to the possible ways in which the known upper holding points 23 have already been attached in vehicles up until now.

The assembly of the represented holder 4, in addition to the connection plate 5, also has two supporting brackets 6 attached thereto which are arranged parallel at a distance from each other. In these supporting brackets 6 first connecting means 7 are formed in the region of the end remote from the connecting plate. These first connecting means 7 are in the form of a gear tooth system. They do not necessarily have to be formed on each of the two supporting brackets 6, but it is in principle sufficient for them to be formed on only one of the two supporting brackets 6. On the other hand it is necessary for an oblong hole 8 to be present in each of the two opposite supporting brackets 6 in each case.

In the oblong hole 8 the assembly of the deflector 11 is housed in the holder 4. The deflector 11 comprises a spindle 13, arranged within the oblong holes 8. A reel 12 is arranged concentrically about this spindle 13. In addition the spindle 13 is connected to a housing 24, which has two lateral surfaces 16 and a casing surface 14. The casing surface 14 is essentially formed as a cylindrical casing surface concentrically about the spindle 13. Within the casing surface 14 an outlet slot 15 is formed parallel to the spindle 13. The seat belt strap 29 of a three-point belt 2, which is guided over the reel 12 within the deflector 11, runs through this outlet slot 15.

Second connecting means 17 are formed on each of the two lateral surfaces 16 of the housing 24. These are matched to the first connecting means 7 on the supporting bracket 6 of the holder 4. In the case represented the formation is the reverse of the gear tooth system on the supporting brackets 6. In principle it is also possible here for second connecting means 17 to be arranged on only one of the lateral surfaces 16, but it is preferred that these are formed on both lateral surfaces 16. Should second connecting means 17 be formed on only one of the two lateral surfaces 16, it must be ensured that, if first connecting means 7 are formed, only one of the two supporting brackets 6, these are present on the respective elements facing each other.

A spring 10, in the form of a spiral spring, is fixedly attached to the connecting plate 5 of the holder 4. The attachment can take place in force- or form-locking manner. In the region of its free ends 28 the spring 10 presses the spindle 13 of the deflector 11 forwards within the oblong hole 8 (to the right in the diagram). This means that the second connecting means 17 of the deflector 11 are engaged with the first connecting means 7 of the holder 4. The deflector 11 is thus located in a locked position, as the spindle 13 and thus the casing surface 14 with the outlet slot 15 cannot be rotated. The upper holding point 23 of the three-point belt 2 is thus secured in this locked position and cannot be changed by pulling the three-point belt 2 upwards or forwards.

The free ends 28 of the spring 10 are in each case guided through a bore 26 at the ends of the spindle 13. The spindle 13 is thus prevented from being pushed in axial direction. Moreover, the spindle 13 is thus fixed and cannot rotate. In the embodiment example represented the reel 12 and the housing 24 are thus not formed in one piece with the stationary spindle 13, but these two parts can be rotated about the spindle 13 so long as they are in the adjustment position (see FIG. 2). It is equally possible to form the spindle 13 in one piece with the reel 12 and/or the housing 24. The spring 10 must then press on the spindle 13 such that a rotation of the spindle 13 is possible. Instead of the bores 26, a groove could for example be formed, running (partly) round the ends 27 of the spindle 13 in which the spring 10 runs. Any other versions of the spring 10 and of the spindle 13 which allow cooperation between these two parts are equally possible, the spindle 13 being able to rotate but still not displaceable in axial direction and being at the same time pushed forwards within the oblong hole 8.

The deflection device 3 is located behind a shield 18 over which it partly projects with its casing surface 14. An aesthetically attractive closure between the deflection device 3 and the upholstery 20 of the backrest 19 is thereby achieved. In addition an occupant cannot inadvertently sustain an injury by unintentionally inserting his hand into the deflection device 3. The deflection device 3 is in fact completely enclosed by the deflector 18.

In FIG. 2 the deflection device according to the invention 3 is shown in an adjustment position. For reasons of clarity, the upholstery 20 and the supporting member 9 are not shown again. The adjustment position shown is achieved by exerting pressure 25 in the direction of the double arrow on the deflector 11 via its casing surface 14. The spindle 13 is thus moved against the spring force of the spring 10 about the release path 21 along the oblong hole 8. The spring 10 is thus compressed and the spindle 13 pushed to the left within the oblong hole 8. This has the effect that the first connecting means 7 of the supporting brackets 6 no longer engage with the second connecting means 17 of the lateral surfaces 16 of the deflector 11. It is thereby possible to rotate the deflector 11 about the spindle 13. In the case shown this has already taken place about a certain angle, as the outlet slot 15 has already moved upwards relative to its position represented in FIG. 1. The outlet slot 15 can then be rotated into the optimum height for the occupant on the vehicle seat 1.

FIG. 3 shows a position assumed following a height adjustment of the deflection device 3. Compared with the adjustment position shown in FIG. 2 the deflector 11 has been rotated still further in anticlockwise direction, with the result that the outlet slot 15 has been moved still further upwards. Once the desired height of the outlet slot 15 is reached, the pressure 25 on the casing surface 14 of the deflector 11 is removed, with the result that the spring 10 again pushes the spindle 13 to the right within the oblong hole 8 and the second connecting means 17 of the lateral surface 16 of the deflector 11 again engage with the first connecting means 7 on the supporting brackets 6 of the holder 4. In this position which, apart from the height of the outlet slot 15 and thus of the upper holding point 23, corresponds to that in FIG. 1, the deflector 11 is again in its locked position, with the result that it can no longer be rotated about the spindle 13. The upper holding point 23 is thus also securely fixed in this position, with no possibility of it being inadvertently changed.

It is self-evident that any locked positions—not shown—between the lowest upper holding point 23 of FIG. 1 and the highest upper holding point 23 in FIG. 3 can be obtained. For this purpose it is merely necessary for the first connecting means 7 to be able to be brought to engage with the second connecting means 17 in the desired position. How great the distances are between two adjacent points for the upper holding point 23 therefore depends on the fineness of the respective first connecting means 7 and the respective second connecting means 17.

As the outlet slot 15 is located on a cylindrical casing surface 14, the upper holding point 23 does not move along a vertical straight line but on a circular path about the spindle 13. A horizontal relative path 22 is thus obtained, which depends on the height of the chosen upper holding point 23. This means that, in the case of smaller occupants, the upper holding point 23 is located further back (left in the diagram) and in the case of larger occupants further forwards. This is advantageous for the optimum operation of the three-point belt 2.

The three-dimensional view shown in FIG. 4 once again illustrates how the deflection device according to the invention 3 is formed. In particular it can be clearly seen how it is located under the shield 18 and how the second connecting means 17 are formed as gear tooth systems on the lateral surface 16 of the deflector 11. In addition it can be clearly seen that the spring 10 presses the spindle 13 to the right—i.e. in the direction of the shield 18—and how its free ends 28 pass through the bores 26 in the region of the ends 27 of the spindle 13.

Figure 5:
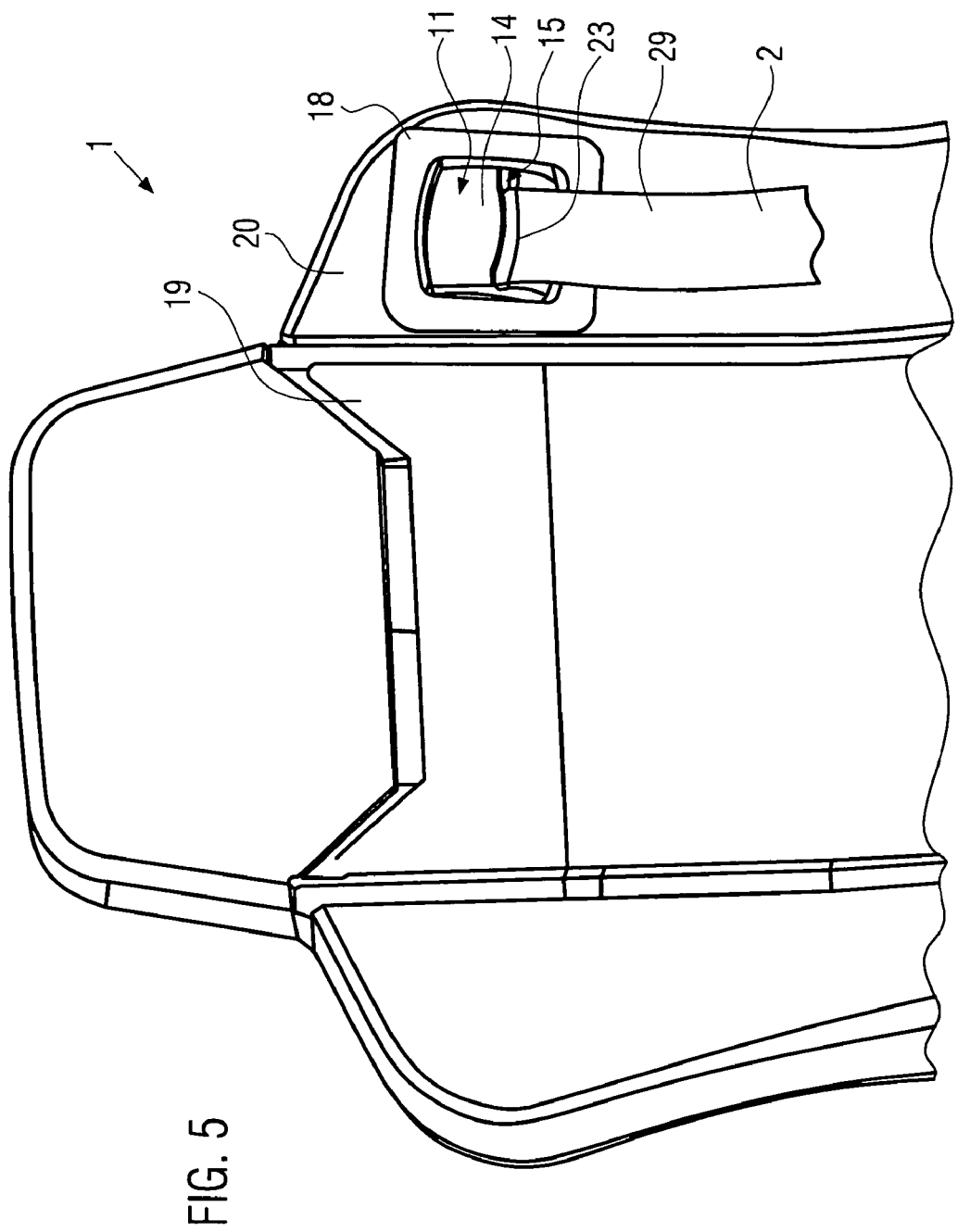

FIG. 5 shows a vehicle seat 1 according to the invention with an integrated height-adjustable deflection device 3 according to the invention and a three-point belt 2 guided therein. Here it is very clear that such an arrangement is aesthetically very pleasing. In addition, by means of the shield 18 there is a complete enclosure of the deflection device 3 according to the invention within the backrest 19 of the vehicle seat 1 in the upholstery 20. An injury during operation—for example during height adjustment of the deflection device 3—is thus ruled out. This also applies if the height-adjustable deflection device 3 is adjusted without looking when seated.

In summary it can be said that the invention provides a deflection device 3 which, compared with the conventional versions, is impressive due to its very compact structure, which in addition is very capable of being integrated within a vehicle seat 1 and is completely enclosed, with the result that the risk of injury is virtually zero, and is virtually maintenance-free, as no dirt gets into it. In addition the deflection device 3 according to the invention consists of only a few parts. In fact merely three components are necessary, namely a holder 4, a deflector 11 and a spring 10 arranged between them, as the deflector 11 also serves as an actuating element at the same time. There is then also no need for an additional further deflector 11 attached belt-side. Moreover, the deflection device 3 according to the invention ensures good belt-retraction behaviour, as rolling friction predominantly arises instead of sliding friction. The deflection device 3 according to the invention does not click and makes no other sounds, as it is a system in which the deflector 11 is pressed in the holder 4 by means of the pre-sprung spindle 13.

REFERENCE NUMBERS LIST

1 Vehicle seat
2 Three-point belt
3 Deflection device
4 Holder
5 Connecting plate
6 Supporting brackets
7 First connecting means
8 Oblong hole
9 Supporting member
10 Spring
11 Deflector
12 Reel
13 Spindle
14 Casing surface
15 Outlet slot
16 Lateral surface
17 Second connecting means
18 Shield
19 Backrest
20 Upholstery
21 Release path
22 Relative path
23 Upper holding point
24 Housing
25 Pressure
26 Bore
27 End of the spindle
28 Free end of the spring
29 Seat belt strap

What is claimed:

1. Height-adjustable deflection device for an upper holding point of a three-point belt having a holder, which can be attached to a supporting member of a vehicle seat or can be fixedly connected to a framework of a vehicle, comprising:
   a deflector moveably attached to the holder, and having a reel with a spindle, via which a seat belt strap of the three-point belt can be guided, and a housing with an outlet slot for the seat belt strap;
   first connecting means formed on the holder; and
   second connecting means formed on the deflector
   wherein the first and second connecting means engage with each other in a locked position in a form-locking manner and do not engage with each other in an adjustment position whereby the deflector can be rotated about the spindle,
   wherein the spindle of the deflector is pressed into the locked position by means of a spring and the holder has a connecting plate and two supporting brackets, each supporting bracket defining an oblong hole to receive the spindle of the deflector and wherein the deflector and the reel have a single coincident spindle.

2. Height-adjustable deflection device according to claim 1, characterized in that the first connecting means and the second connecting means are each gear tooth systems.

3. Height-adjustable deflection device according to claim 1, characterized in that the spring is a coil spring.

4. Height-adjustable deflection device according to claim 1, characterized in that the housing of the deflector has a casing surface which is cylindrical, or concentrically convex, about the spindle.

5. Height-adjustable deflection device according to claim 1, characterized in that the reel further comprises a belt-retractor.

6. Height-adjustable deflection device according to claim 1, characterized in that the device includes means for linking it to the vehicle seat and the deflector further comprises a partially encompassing shield.

7. Height-adjustable deflection device according to claim 1, characterized in that the spindle comprises, in the region of each of its two ends, a bore through which free ends of the spring are guided.

8. Height-adjustable deflection device according to claim 1, characterized in that the spindle is formed in one piece with one of the reel, the housing, or the reel and the housing.

9. Vehicle seat with a three-point belt comprising a height-adjustable deflection device according claim 1.

10. Height-adjustable deflection device according to claim 1, characterized in that the spindle comprises, in the region of each of its two ends, a bore through which free ends of the spring are guided, and further characterized in that the spindle is formed in one piece with the reel, the housing, or the reel and the housing.

11. Height-adjustable deflection device according to claim 1, characterized in that the first connecting means and the second connecting means are each gear tooth systems, and further characterized in that the housing of the deflector has a casing surface which is cylindrical or concentrically convex, about the spindle.

12. Height-adjustable deflection device according to claim 1, characterized in that the first connecting means and the second connecting means are each gear tooth systems, and further characterized in that the reel further comprises a belt-retractor.

13. Height-adjustable deflection device according to claim 1, characterized in that the first connecting means and the second connecting means are each gear tooth systems, and further characterized in that the spindle comprises, in the region of each of its two ends, a bore through which free ends of the spring are guided.

14. Height-adjustable deflection device according to claim 1, characterized in that the first connecting means and the second connecting means are each gear tooth systems, and further characterized in that the spindle is formed in one piece with the reel, the housing, or the reel and the housing.

15. Height-adjustable deflection device according to claim 1, characterized in that the housing of the deflector has a casing surface which is cylindrical or concentrically convex, about the spindle, and further characterized in that the reel further comprises a belt-retractor.

16. Height-adjustable deflection device according to claim 1, characterized in that the housing of the deflector has a casing surface which is cylindrical or concentrically convex, about the spindle, and further characterized in that the spindle comprises, in the region of each of its two ends, a bore through which free ends of the spring are guided.

17. Height-adjustable deflection device according to claim 1, characterized in that the housing of the deflector has a casing surface which is cylindrical or concentrically convex, about the spindle, and further characterized in that the spindle is formed in one piece with the reel, the housing, or the reel and the housing.

18. Height-adjustable deflection device according to. claim 1, characterized in that the reel further comprises a belt-retractor, and further characterized in that the spindle comprises, in the region of each of its two ends, a bore through which free ends of the spring are guided.

19. Height-adjustable deflection device according to claim 1, characterized in that the reel further comprises a belt-retractor, and further characterized in that the spindle is formed in one piece with the reel, the housing, or the reel and the housing.

20. Height-adjustable deflection device for an upper holding point of a three-point belt having a holder, which can be attached to a supporting member of a vehicle seat or can be fixedly connected to a framework of a vehicle, comprising:
   a deflector moveably attached to the holder, and having a reel comprising a belt retractor with a spindle, via which a seat belt strap of the three-point belt can be guided, and a housing with an outlet slot for the seat belt strap;
   first gear tooth system formed on the holder; and
   second gear tooth system formed on the deflector
   wherein the first and second gear tooth system engage with each other in a locked position in a form-locking manner and do not engage with each other in an adjustment position whereby the deflector can be rotated about the spindle,
   wherein the spindle of the deflector is pressed into the locked position by means of a spring, the holder has a connecting plate and two supporting brackets, in each of which an oblong hole is formed to receive the spindle of the deflector, and the spindle is formed in one piece with the reel, the housing, or the reel and the housing, and
   wherein the deflector and the reel have a single coincident spindle.

* * * * *